G. CIPOLLINA.
STEAM ENGINE POWER GAGE.
APPLICATION FILED OCT. 11, 1907.
956,680.
Patented May 3, 1910.
2 SHEETS—SHEET 1.
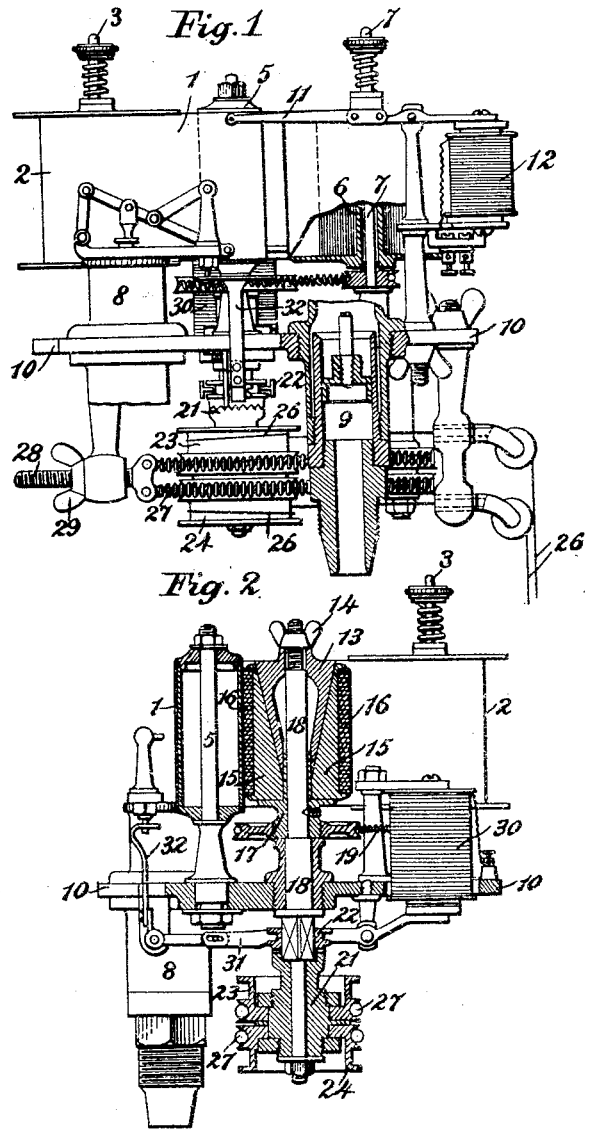

G. CIPOLLINA.
STEAM ENGINE POWER GAGE.
APPLICATION FILED OCT. 11, 1907.
956,680.
Patented May 3, 1910.
2 SHEETS—SHEET 2.
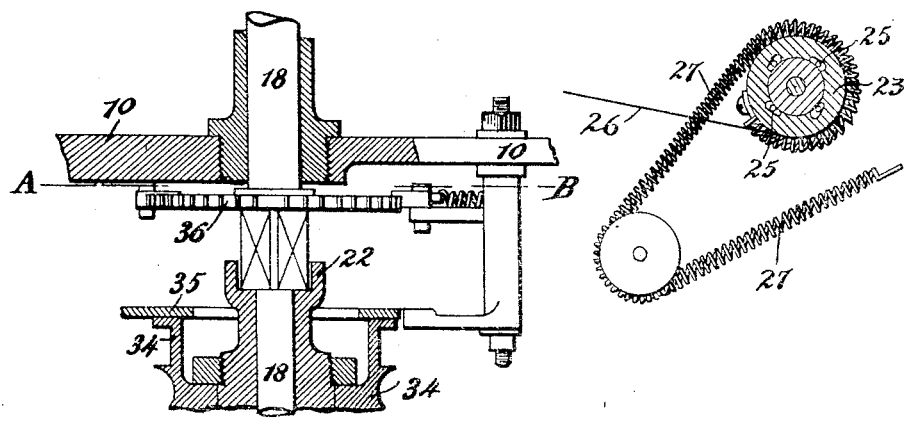
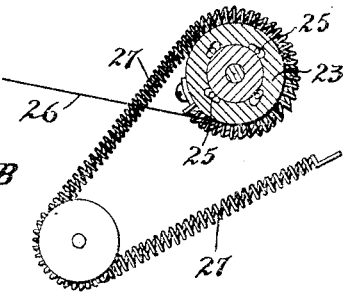
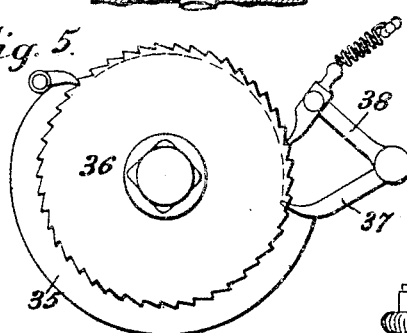
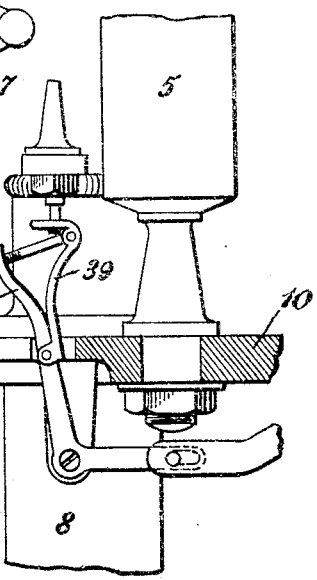
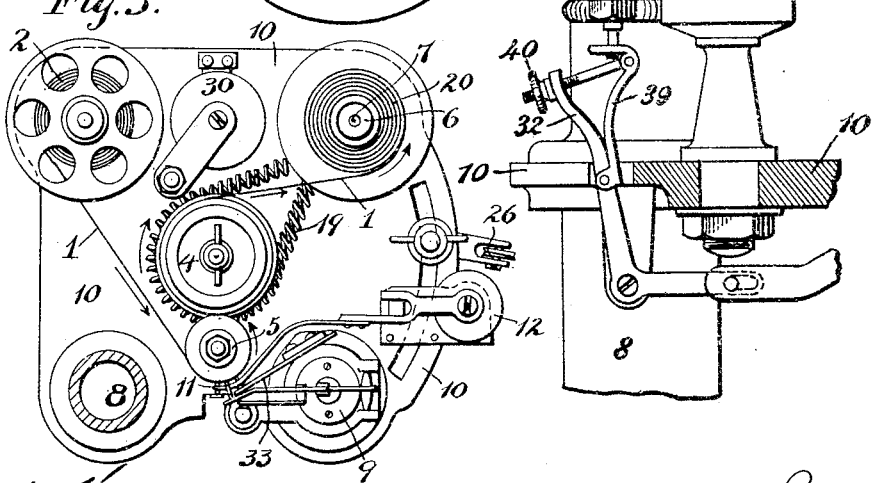

UNITED STATES PATENT OFFICE.

GIUSEPPE CIPOLLINA, OF GENOA, ITALY, ASSIGNOR TO GASPARE BERNATI AND LUIGI CECCHI, OF GENOA, ITALY.

STEAM-ENGINE POWER-GAGE.

956,680.  Specification of Letters Patent.  Patented May 3, 1910.

Application filed October 11, 1907. Serial No. 396,949.

*To all whom it may concern:*

Be it known that I, GIUSEPPE CIPOLLINA, a subject of the King of Italy, residing at Genoa, Italy, have invented new and useful Improvements in Steam-Engine Power-Gages, of which the following is a specification.

The object of this invention is to be able to automatically record on a simple strip of paper, either continuously or periodically, the elements for calculating the power of a steam engine, and to protect the record against interference by the operator.

Another object is to be able to obtain, in the case of testing new engines or making special observation and study, exact average figures without the necessity of special, costly and cumbersome instruments for recording these elements separately. Moreover, this apparatus working automatically and therefore independently of the will of the operator, gives unquestionably an exact indication of the state of the engine to which it is applied.

In the annexed drawings which show one form of the present invention: Figure 1 is an elevation partially in section of the apparatus; Fig. 2 is a section at right angles to Fig. 1; Fig. 3 is an horizontal section of same; Fig. 4 is a vertical section showing a modification of paper strip feeding mechanism; Fig. 5 is a plan view of the ratchet wheel, and Fig. 6 is a part elevation of the modified paper strip feeding mechanism. Fig. 7 is a detail view (partly in section and partly in elevation) referred to hereinafter.

In the above apparatus the records are registered on a strip of paper 1 unrolling itself from the roll 2 running on the spindle 3 and which following the path indicated by the arrows, (Fig. 3) is wound direct on the two drums 4, 5 and then on the spindle 7. There are four indicating points, two belonging to two indicator cylinders 8, 9 mounted on the plate 10 so that their center lines are exactly perpendicular to the plate, and the points as close together as possible when they are working on the paper 1. These two cylinders are placed in communication respectively with the high and the low pressure steam of the engine under observation, and by means of their pistons and relative parallel movements work the indicating points which record the movement imparted to them on the strip of paper the same as in an ordinary indicator. The third indicating point 11, designed to record the time, is moved by an electromagnet 12 connected to a clock with electric contact every 20 or 30 seconds, so that the pencil will register at every contact.

The winding of the paper on the spindle 7 is effected as follows: The drum 5 is, say, of brass, and loose on its shaft; the drum 4 is an expanding one, comprising a reversed cone 13 (Fig. 2), which by means of a set screw 14 is capable of acting on an ebonite roll 15 divided into four parts by planes passing through its center and having conical bores exactly in accordance with cone 13; these four parts are held cylindrically by a rubber ring 16 and the whole is mounted on a sleeve 17 fixed on the shaft 18, the latter and that of the drum 5 being exactly perpendicular to plate 10 and placed at such a distance apart that with a little expansion of the rubber ring 16, the drum 5 is acted upon by friction and receives any movement imparted to it from shaft 18. On a neck or recess cut into sleeve 17 a little elastic belt 19 is wound which transmits the movement of the sleeve 17 and consequently that of the drum 4 to a loose pulley on shaft 7; at the same time this pulley transmits by friction only the movement to a little tube 6 on which the paper 1 is fastened. The friction of this little roller with the pulley is determined by a suitable adjustable spring situated on the top of the spindle so that the movement which the shaft 18 imparts to the drum 4 is transmitted to the paper, which winding itself on the drums 5 and 4 passes along owing to friction which can be regulated by more or less adjusting the cone 13 of the expanding drum, and the paper which by this movement is unrolled from the roll 2, is wound again on the little tube 6 to which the movement of the shaft 18 is transmitted by the elastic belt 19, and as by increasing the diameter of roll 20 the winding speed of the little tube 6 is varied because that passing between the drums 5 and 7 remains constant, this little tube 6 is moved by a slight friction obtained by the spring situated at the top of the spindle 7.

The movement of shaft 18 is obtained in a special manner as follows. The lower part of this shaft has a square sectioned and a cylindrical sectioned portion, and on the latter a cylindrical coupling 21 turns freely, having teeth on its top side which may be engaged by a disconnecting clutch 22 sliding on the square sectioned part of the shaft. On the coupling 21 two circular disks 23 and 24 are fixed which, as indicated more clearly in Fig. 7, have four tangentially arranged internal chambers, 25 and in which four little steel rollers work which cause the disks to become as if they were integral with coupling 21 when the disks are turning in one direction, and when they turn in the opposite direction they remain loose on the said coupling.

The disks 23 and 24 have on their outer surface two grooves, in one of which a cord 26 is wound which is attached at one end to a mechanism worked from the piston, and on the other end to a return spring 27 adjustable by set screws 28 and 29 so that by the tension of cords 26 the disks 23 and 24 communicate a rotary movement of clutch 22 to shaft 18, and on the release of the cords 26 the disks owing to springs 27 are restored to their first position without communicating any movement to 21. Now, if the two cords are fixed to the same mechanism of the engine so that when the one acts by tension, the other returns to its normal position, and vice versa, it follows that the coupling 21, will receive a continuous rotary movement communicated to it by a stroke of piston from the disk 23, and by the other from the disk 24 so that the paper 1 will travel between the two drums with a movement proportional to that of disk 23 and 24 during the period of active rotation, and consequently also proportional to the stroke of the piston.

In order to reduce the length of the path of the paper strip during the inoperative period of the apparatus thus permitting of continuously recording the revolutions of the engine and the time for effecting the same, the record of the steam diagrams remaining periodical, the following arrangement has been provided: Levers 31 and 32 designed to move the indicating points away from drum 4 in the periods of rest of apparatus, act only on one of the indicating points of the steam diagrams, while the other always remains close to the said drum. On disk 23 a socket 34 is secured. On shaft immediately below plate 10 a ratchet wheel 36 is fixed, and on plate 10 the double spring acted pawl 37, 38 is mounted which during the intermittent rotary movement of disk 23 and consequently socket 34 imparts to the said ratchet wheel 36 and consequently shaft 18 a small rotary movement, so that on disk 22 becoming disengaged, shaft 18 receives a reduced movement, and consequently the travel of the paper strip will also be shortened, and the indicating point will record signs very close to each other corresponding to the revolutions performed by the engine.

It is understood that during the operative periods of the engine, pawls 37 and 38 will continue to act without in any way influencing the movement of shaft 18. Lever 32 has a spring 39 adjustable by screw 40 to permit of controlling the rate of approachment of the indicating points during the action. An electromagnet 30 acts on the clutch 22 so as to cause the coupling 21 to be loose or fixed on shaft 18 whereby periods of action are obtained according to the lengths of the periods previously established, by the circuit closed in the electromagnet 30. Simultaneously with the locking of disk 22 with coupling 21, the indicating points of the power measuring cylinders by means of levers 31 and 32 approach the paper 1 to drum 4, while in unlocking or during the periods of inactivity, they recede. The fourth indicating point 33, adjustable at will, and constantly maintained in contact with the paper on the drum 4 is for continuously marking the atmospheric line.

Having now fully described my said invention and the manner in which the same is to be performed, what I claim and desire to secure by Letters Patent of the United States is:

1. In an apparatus of the character described, the combination of two cylinders simultaneously taking differential diagrams, two paper feeding drums 4 and 5, one of which is frictionally rotated from the other, said drum 4 comprising an endwise adjustable cone 13, a divided roll 15 upon the cone and an elastic sleeve surrounding the roll 15, a sleeve 17 carrying the drum 4, a rotatable shaft 18 to which the said sleeve 17 is secured and means for continuously rotating the shaft 18.

2. In an apparatus of the character described, the combination of two cylinders simultaneously taking differential diagrams, paper feeding drums 4 and 5, one of which is frictionally rotated from the other, a rotatable shaft 18 on which the drum 4 is loosely mounted and means for rotating said shaft comprising a sleeve secured thereto and carrying the drum 4, a sleeve 21 loose on a cylindrical portion of shaft 18, disks 23, 24, loosely carried by the sleeve 21, a clutch between each of said disks and the latter sleeve and operating as described, a cord attached at one end to each of the disks, and adapted to wind thereon, and a return spring also attached to each disk, and coöperating as and for the purpose set forth.

3. In an apparatus of the character described, the combination of two cylinders simultaneously taking differential diagrams, two paper feeding drums 4 and 5, a rotatable shaft on which drum 4 is loosely mounted, a sleeve secured to said shaft and carrying the drum 4, a sleeve 21 loose on the shaft 18 and having teeth at its upper end, disks 23, 24, loose on sleeve 21, a clutch between each disk and the sleeve 21 and operating as described, means for rotating the disks in one direction, return springs operating to turn the disks in the opposite direction as set forth, a clutch 22 slidingly mounted on a squared part of shaft 18, and adapted to engage the said teeth of sleeve 21, electro-magnetically operated levers 31, 32 arranged to operate the indicator points as described, and also the clutch 22.

4. In an apparatus of the character described, the combination of two cylinders simultaneously taking differential diagrams, indicator points arranged as described, two paper feeding drums 4 and 5, a rotatable shaft on which drum 4 is loosely mounted, a sleeve secured to said shaft and carrying the drum 4, a sleeve 21 loose on the shaft 18, and having teeth at its upper end, disks 23, 24, loose on sleeve 21, a clutch between each disk and the sleeve 21 and operating as described, means for rotating the disks in one direction, return springs operating to turn the disks in the opposite direction as set forth, a clutch 22 slidingly mounted on a squared part of shaft 18, and adapted to engage the said teeth of sleeve 21, electro-magnetically operated levers 31, 32, arranged to operate the indicator points as described, and also the clutch 22, a ratchet wheel 36 geared on shaft 18, and spring actuated pawls 37, 38 arranged and adapted to actuate the ratchet wheel as described.

In testimony whereof I have signed my name to this specification in the presence of two subscribing witnesses.

GIUSEPPE CIPOLLINA.

Witnesses:
H. HILIOFLIRAFFA,
ANGELO BORAGINO.